US007443977B1

(12) United States Patent
Toumani et al.

(10) Patent No.: US 7,443,977 B1
(45) Date of Patent: Oct. 28, 2008

(54) METHOD AND APPARATUS FOR A HIGH EFFICIENCY LINE DRIVER

(75) Inventors: Rouben Toumani, San Jose, CA (US); Robert A. Blauschild, Los Altos, CA (US); Sanjay M. Bhandari, San Jose, CA (US); Behrooz Rezvani, San Ramon, CA (US); Dale Smith, Fremont, CA (US)

(73) Assignee: Ikanos Communication, Inc., Fremont, CA (US)

( * ) Notice: Subject to any disclaimer, the term of this patent is extended or adjusted under 35 U.S.C. 154(b) by 587 days.

(21) Appl. No.: 11/267,652

(22) Filed: Nov. 3, 2005

Related U.S. Application Data

(62) Division of application No. 09/962,490, filed on Sep. 24, 2001, now Pat. No. 6,987,851.

(60) Provisional application No. 60/234,717, filed on Sep. 22, 2000.

(51) Int. Cl.
    H04M 1/00 (2006.01)
(52) U.S. Cl. ................................. 379/399.01
(58) Field of Classification Search ........................ None
    See application file for complete search history.

(56) References Cited

U.S. PATENT DOCUMENTS 3,720,880 A    3/1973  Le Seigneur
4,218,660 A    8/1980  Carver
4,571,554 A    2/1986  Martin
4,873,493 A   10/1989  Fujiwara
4,961,219 A   10/1990  Patel
6,195,028 B1   2/2001  Fredrickson
6,987,851 B1 * 1/2006  Toumani et al. ........ 379/399.01

OTHER PUBLICATIONS

LM2635 5-Bit Programmable Synchronous Buck Regulator Controller Controller, Specification, May 2000, 13 pages, National Semiconductor Corporation.

* cited by examiner

*Primary Examiner*—Ramnandan Singh
(74) *Attorney, Agent, or Firm*—IP Creators; Charles C Cary

(57) ABSTRACT

A high efficiency line driver is disclosed. The line driver may be applied with equal advantage in wired and wireless communication media to amplify data signals with a minimum of power consumption. In an embodiment of the invention a line driver is disclosed which includes: at least one amplifier, a delay element, a control signal generator and a generator. The at least one amplifier includes at least one bias supply, a signal input and a signal output. The delay element accepts as an input the data signal and delays delivery of the data signal to the at least one line amplifier for amplification. The generator is responsive to a control signal to generate varying voltage levels corresponding thereto on the at least one bias supply of the at least one amplifier. The control signal generator is responsive to the input data signal to detect peaks therein and to generate the control signal corresponding thereto in advance of delivery of the data signal to the amplifier.

15 Claims, 10 Drawing Sheets

METHOD AND APPARATUS FOR A HIGH EFFICIENCY LINE DRIVER

CROSS REFERENCE TO RELATED APPLICATION

This is a divisional application of prior application Ser. No. 09/962,490 filed on Sep. 24, 2001 entitled "METHOD AND APPARATUS FOR A HIGH EFFICIENCY LINE DRIVER" now U.S. Pat. No. 6,987,851 which application claims the benefit of prior filed Provisional Application No. 60/234,717 filed on Sep. 22, 2000 entitled "High Efficiency Line-Driver" both of which are incorporated herein by reference in their entirety as if fully set forth herein.

BACKGROUND OF THE INVENTION

1. Field of Invention

The field of the present invention relates in general to modems and line drivers and more particularly reducing power dissipation therein.

2. Description of the Related Art

The North American Integrated Service Digital Network (ISDN) Standard, defined by the American National Standard Institute (ANSI), regulates the protocol of information transmissions over telephone lines. In particular, the ISDN standard regulates the rate at which information can be transmitted and in what format. ISDN allows full duplex digital transmissions of two 64 kilo bit per second data channels. These data rates may easily be achieved over the trunk lines, which connect the telephone companies' central offices. The problem lies in passing these signals across the subscriber line between the central office and the business or residential user. These lines were originally constructed to handle voice traffic in the narrow band between 300 Hz to 3000 Hz at bandwidths equivalent to several kilo baud.

Digital Subscriber Line (DSL) technology and improvements thereon including G.Lite, ADSL, VDSL, HDSL (all of which are broadly identified as X-DSL) have been developed to increase the effective bandwidth of existing subscriber line connections, without requiring the installation of new fiber optic cable. An X-DSL modem operates at frequencies higher than the voice band frequencies, thus an X-DSL modem may operate simultaneously with a voice band modem or a telephone conversation. There are two line codes for modulating for XDSL communications: discrete multi-tone (DMT) and carrierless AM/PM (CAP). Currently, there are over ten discrete XDSL protocols, including: G.Lite, ADSL, VDSL, SDSL, MDSL, RADSL, HDSL, etc.

One of the primary factors limiting the bandwidth or channel capacity of any of the above discussed X-DSL protocols is power. Large amounts of power are required to drive high baud rates across subscriber lines or other wired or wireless communication media. Most of the power in X-DSL systems is consumed in the line driver which drives the modulated signal onto the subscriber line. The line driver may account for 60% or more of the overall system power requirement.

The modulated signal supplied to a line driver typically has a normal power distribution, meaning that the peak-to-average power ratio is relatively high. Thus to avoid clipping or other distortion the occasional high peak signals require a high voltage supply. Efforts have been made to reduce the amount of power consumed in a line driver by use of multiple power levels. Texas Instruments THS6032 Class G amplifier architectures use four power supplies at ±5 and ±15 Volts to reduce power consumption. The ADSL line to which this amplifier is coupled is driven at higher voltage levels only when required. U.S. Pat. No. 6,028,486 entitled "Method and Apparatus for Reducing Power Dissipation in Multi-Carrier Amplifiers" issued on Feb. 22, 2000 and assigned to Telefonaktiebolaget LM Ericsson also teaches apparatus for reducing power in a DSL line driver. In a first embodiment, resembling that employed in the Texas Instruments device, a single amplifier is switchably connected to high and low power supplies, in response to the threshold level of an input signal. In a second embodiment, dual amplifiers, one with a high power supply and the other with a low power supply, are switchably connected to the load in response to the threshold level of an input signal. Both the Texas Instruments and Ericsson designs require an increase in the number of power supplies and/or amplifiers associated with a subscriber line.

What is needed are approaches to power reduction with an improved form factor when compared with the prior art designs.

SUMMARY OF THE INVENTION

An high efficiency line driver is disclosed. The line driver may be applied with equal advantage in wired and wireless communication media to amplify data signals with a minimum of power consumption.

In an embodiment of the invention a line driver is disclosed which includes: at least one amplifier, a delay element, a control signal generator and a generator. The at least one amplifier includes at least one bias supply, a signal input and a signal output. The delay element accepts as an input the data signal and delays delivery of the data signal to the at least one line amplifier for amplification. The generator is responsive to a control signal to generate varying voltage levels corresponding thereto on the at least one bias supply of the at least one amplifier. The control signal generator is responsive to the input data signal to detect peaks therein and to generate the control signal corresponding thereto in advance of delivery of the data signal to the amplifier.

In an embodiment of the invention a method for driving a data signal input onto a communication medium is disclosed. The method comprises the acts of:

detecting at least one peak within each successive windowed portion of the data signal;

creating at least one control signal with a magnitude corresponding to the at least one peak within each successive windowed portion of the data signal;

generating varying bias voltage levels responsive to the delivery of the control signal;

delaying the data signal input to synchronize with the detecting, creating and generating acts; and amplifying the data signal input delayed in said act of delaying using the varying bias voltage levels generated in said act of generating to drive the data signal onto the communication medium.

A corresponding means is also disclosed.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF THE EMBODIMENTS

An apparatus and method for reducing power required for an X-DSL line driver is disclosed. The apparatus may be applied with equal advantage to communication protocols other than X-DSL. The apparatus may be applied with equal advantage in wired and wireless media.

There are two line codes for modulating for XDSL communications: discrete multi-tone (DMT) and carrierless AM/PM (CAP). DMT signals are known to have large Peak-to-Average Ratio (PAR) in the signal. Conventional line drivers need to choose DC supply voltage values for line driver amplifiers based on maximum peak values in the output signal such that the amplifier does not clip the signal. This results in the line drivers operating at consistently high power levels even during intervals of average signal strength.

The current invention avoids this problem by varying the power supplied to the line amplifier to conform with the signal. The bias current/voltage to the line amplifier may be intermittently changed over successive sampling intervals to maintain a bias on the line amplifier sufficient to respond to the peak requiremetns present during the amplification of a delayed input signal from which each sample interval is obtained. The circuit remains responsive over short time intervals to large variations in the peak power but generally operates at or intermittently below the average power level. This reduces average power consumption by 50% or more when compared with conventional fixed power designs, while still remaining responsive to peak power excursions.

Figure 1A:
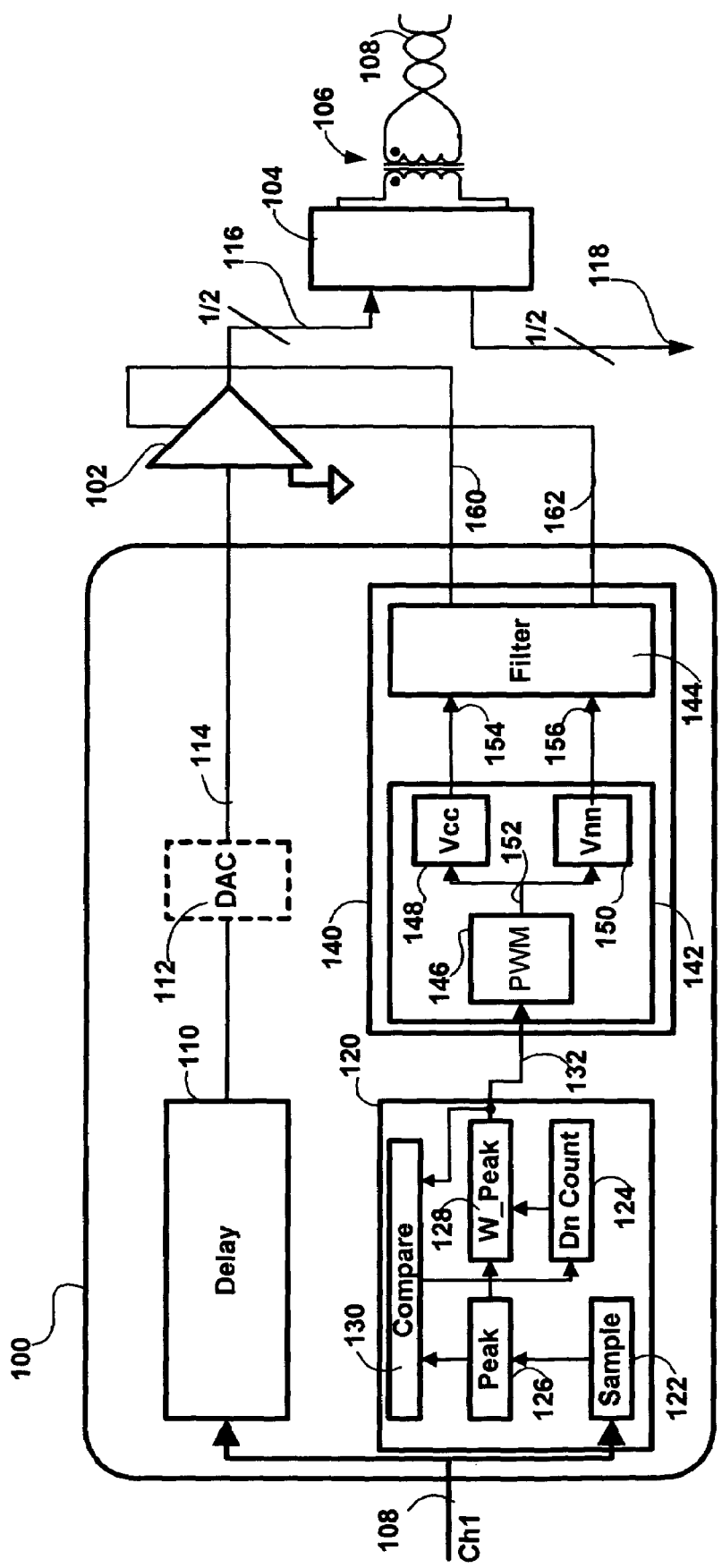
FIG. 1A is a combined hardware and logic block diagram of a high efficiency line driver.

FIG. 1A is a combined hardware and logic block diagram of a high efficiency line driver using the apparatus and methods of this invention. A power management circuit 100, a line amplifier 102, a hybrid 104, a transformer 106 and a subscriber line 108 are shown. All components are designed to minimize power consumption required to drive information signals onto the subscriber line. The power management circuit includes a delay element 110, a digital-to-analog converter (DAC) 112, a control signal generator 120 and a power generator 140. The control signal generator includes in this embodiment of the invention: a sample buffer 122, a sample peak detector 126, a window register 128, a comparator 130, and a resettable down counter 124. The power generator includes a supply 142 and filters 144. The supply includes in this embodiment a pulse width modulator (PWM) and a pair of power supplies 148-150.

An information signal 108 is received in parallel by the delay element 110 and the control signal generator 120. The information signal may be analog or digital. The information signal is delayed in the delay element by a sufficient amount to allow the control signal generator to detect signal amplitude variations and to vary the power supply to the line amplifier 102 in advance of the arrival of the delayed information. In an embodiment of the invention the synchronization of a look ahead/sliding window implemented by the control signal generator with the delay element avoids clipping and minimizes power consumption by varying the amplifier's supply voltages to conform with the signal peaks detected in the sliding window provided by the control signal generator. The length of the window is determined by the response time of the PWM and power supply filters. The time constant of the power supply filters are primarily determined by the switching frequency of the regulators in the power supply. Generally, the longer the response time of the switching supply and filters the longer the window. This allows sufficient time after peak detection for a controlled ramp up in the power supplied to the line driver so that by the time the peak arrives the power will have reached an appropriate level at which clipping can be avoided.

The window contains a fixed number of samples of interval $T_1$. T1 is generally equal to or longer than the period of the frequency of the PWM. The window is iteratively moved forward along the timeline of the information signal 108 taking in a new sample of interval "$T_1$" and discarding the oldest sample of identical length at the same time. Thus the window maintains a constant length $T_2 = N \times T_1$. Typically, $T_2 >> T_1$. For ADSL the highest frequency information components are found at 1.104 MHz. Peak detection for this protocol will need to be performed well above 2.208 MHz which is the Nyquist rate. This corresponds with peak detection at intervals substantially less than 0.5 uS which corresponds with the inverse of the Nyquist sampling rate. In one embodiment of the invention, $T_1$ is selected to be 5 uSec and T2 40 uS. The longer window size allows a more gradual variation in the bias voltages applied to the amplifier 102. The sampling interval $T_1$ is chosen so as to minimize high frequency components in the bias signals to the line amplifier. The amount of the delay in the delay element should correspond to the length of the lookahead/sliding window.

In operation, the sliding-window look-ahead peak-detector maintains a FIFO queue which contains peak parameters for a fixed interval "$T_2$" of the information signal. The peak parameters are determined by a peak detector 126 which finds a single peak in each of the successive sample sets of interval $T_1$ obtained by the sampler 122. Peaks are determined by the peak detector based on an absolute value of the positive or negative going signals found within each sample set. Thus, in a sample set which includes a positive maximum of 6.8 volts and a negative minimum of −7.2 volts, the single peak detected for the sample interval $T_1$ would be the negative minimum. The sliding window consists of the last "N" sample sets, where N is the ratio of the window interval to the sample interval or $N = T_2/T_1$. In the example given where $T_2$ equals 40 uS and $T_1$ equals 5 uS, the value of N equals 8, which is the reset value for the resettable down counter 124. The peak parameters for the sliding window are maintained by the window peak register 128 operating in conjunction with the resettable down counter 124. The resettable down counter is decremented by one as each new sample set of duration $T_1$ is obtained by the sample buffer 122.

The resetting of the down counter corresponds with a new peak appearing in the sliding window. That can occur under either of two cases. First, a new peak appears in the next sample set which exceeds in absolute magnitude the magnitude of the prior peak still in the window. In this instance the comparator 130 determines that the new peak, the absolute value of which is in the peak detector 126, exceeds the absolute value of the old peak stored in the window register 128. Where this is the case the resettable down counter is reset to "N" and the value for the new peak is stored in window register 128. The value of the down counter corresponds with the location of the new peak within the window. Second, no peak is found in "N" successive samples which exceeds the peak value in the window peak register. In this instance the resettable down counter reaches zero. This coincides with the window passing beyond what had been a maximum. At this point the value for the prior peak in the window peak register is replaced with the value for the new peak in the next sample as determined by the peak detector. Thus, in either the first or second case the old peak value in the window peak register is replaced with the absolute value for the new peak from the peak detector 126 and the down counter is reset to N.

The window register outputs a peak signal 132 at levels which corresponds with the magnitude of the peak within the sliding window and at increments which correspond with the times at which each new sample set is obtained by the sample buffer 122. The peak signal is supplied to the input of the power generator 140, and specifically the PWM 146. The signal may be digital or analog. Overhead is added to the signal to avoid driving the line amplifier into saturation. The PWM outputs a signal constant in frequency and varying in duty cycle. The duty cycle varies in correspondence with the magnitude of the peak signal. The PWM signal 152 is supplied to the positive and negative power supplied 148 and 150. In an embodiment of the invention the power supplies are implemented as buck regulators, one for the generation of Vcc bias in positive bias line 154 and the other for generation of Vnn bias in negative bias line 156. Any additional low pass filtering to eliminate sharp transitions in the peak signal appearing every sample interval $T_1$ may be applied to bias lines 154-156 by filters 144. The filtered positive and negative bias signals 160 and 162 are supplied to the amplifier 102. The analog information signal input 114 of the amplifier comes directly from the delay element 110 where the delay element contains the information signal in analog format or via an intermediate digital-to-analog conversion performed by DAC 112. The transmit signal 116 at the amplifier output, may be either single mode or differential mode analog information signal. This is supplied to the 2-4 wire hybrid 104 for transmission on subscriber line 108 via transformer 106. The receive signal from the subscriber line 108 appears on receive signal line and may also be single or differential mode.

While the invention has been described with respect to an amplifier 102 that require positive and negative supply voltages, the same principles can be applied in an alternate embodiment of the invention in which a line amplifier requiring only a single supply voltage is utilized. A single switching regulator could be used, with successive peaks of the input data signal determining the changing magnitude of the amplifier supply voltage in accordance with the principles discussed above.

In an alternate embodiment of the invention the PWM 148 circuit would be replaced with other types of well known switching regulator configurations, e.g. variable frequency switching regulators using constant ON time or constant OFF time.

Figure 1B:
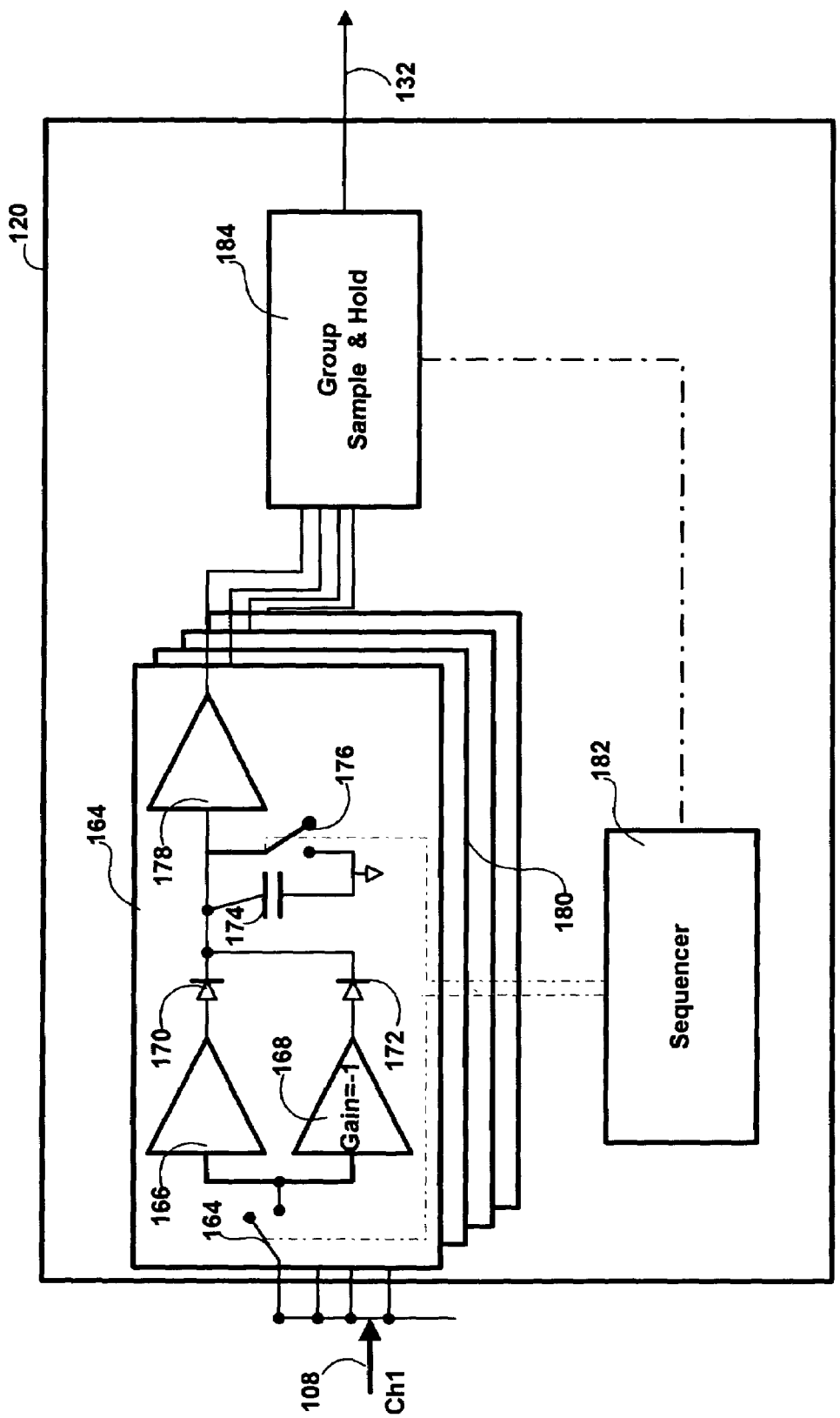
FIG. 1B is an alternate embodiment of the control signal generator shown in FIG. 1A.

FIG. 1B is an alternate embodiment of the control signal generator shown in FIG. 1A. In this analog embodiment a plurality of peak detector blocks of which 164 and 180 are referenced, each with sample windows $T_2$ in duration are coupled in round robin fashion to the input signal at staggered sample intervals of T1 with respect to one another. The outputs of the detector blocks are input to a group sample and hold device 184 which determines the maximum peak within the outputs of the detector blocks and provides a corresponding control signal output on line 132.

In an embodiment of the invention the individual peak detector block, e.g. block 164, includes: unity gain buffer 166, unity gain amplifier 168, diodes 170-172, capacitor 174, reset switch 176, input signal switch 164 and an output buffer 178. Under timing control handled by the sequencer 182 the analog input DMT signal is passed via switch 164 to both the unity gain buffer 166 and inverting unity gain amplifier 168. Outputs of both the buffer and amplifier are passed through corresponding diodes 170-172, respectively and to a common capacitor 174. The capacitor acts to store the maximum of the two voltages. The analog voltage stored on the capacitor corresponds to the peak voltage, minus a diode drop, within the time period between discharges in the capacitor. The buffer 178 provides a corresponding block peak signal on its output to the group sample and hold 184.

In the embodiment shown there are $T_2/T_1$ peak detector blocks. Each of these blocks stores a peak voltage in consecutive portions of the input signal of period $T_2$, with each portion shifted in time by the sample period $T_1$ with respect to each other. For example, the first peak detector block 164 would detect a peak within the interval of the input signal from 0-40 uS, while the second peak detector block 180 would detect a peak within the interval of the input signal from 5 uS-45 uS. In round robin fashion the output of each peak detector block is coupled with a group sample and hold circuit 164. As each block is read into the sample and hold circuit the capacitor of the corresponding peak detector block which has just been coupled with the group sample and hold circuit is discharged via a reset signal from the sequencer 182 to the reset switch in the corresponding block, e.g. reset switch 176. After reset the block is recoupled to the input signal via input switch, e.g. input switch 164. After reinitialization the peak detector block searches for a peak voltage in the next window of $T_2$. After reading peak voltages from peak detector blocks 1-$T_2$/$T_1$ in succession the group sample and hold circuit 184 is coupled to the first peak detector to read the peak for the next interval.

Two sample embodiments have been described above to describe the basic concept. However to the skilled in the art it should be clear that alternate embodiments can be implemented which achieve the same end goal, which is to allow the power supply adequate time to reach the necessary peak level to accommodate the delayed data signal without clipping in the amplifier.

Figure 2:
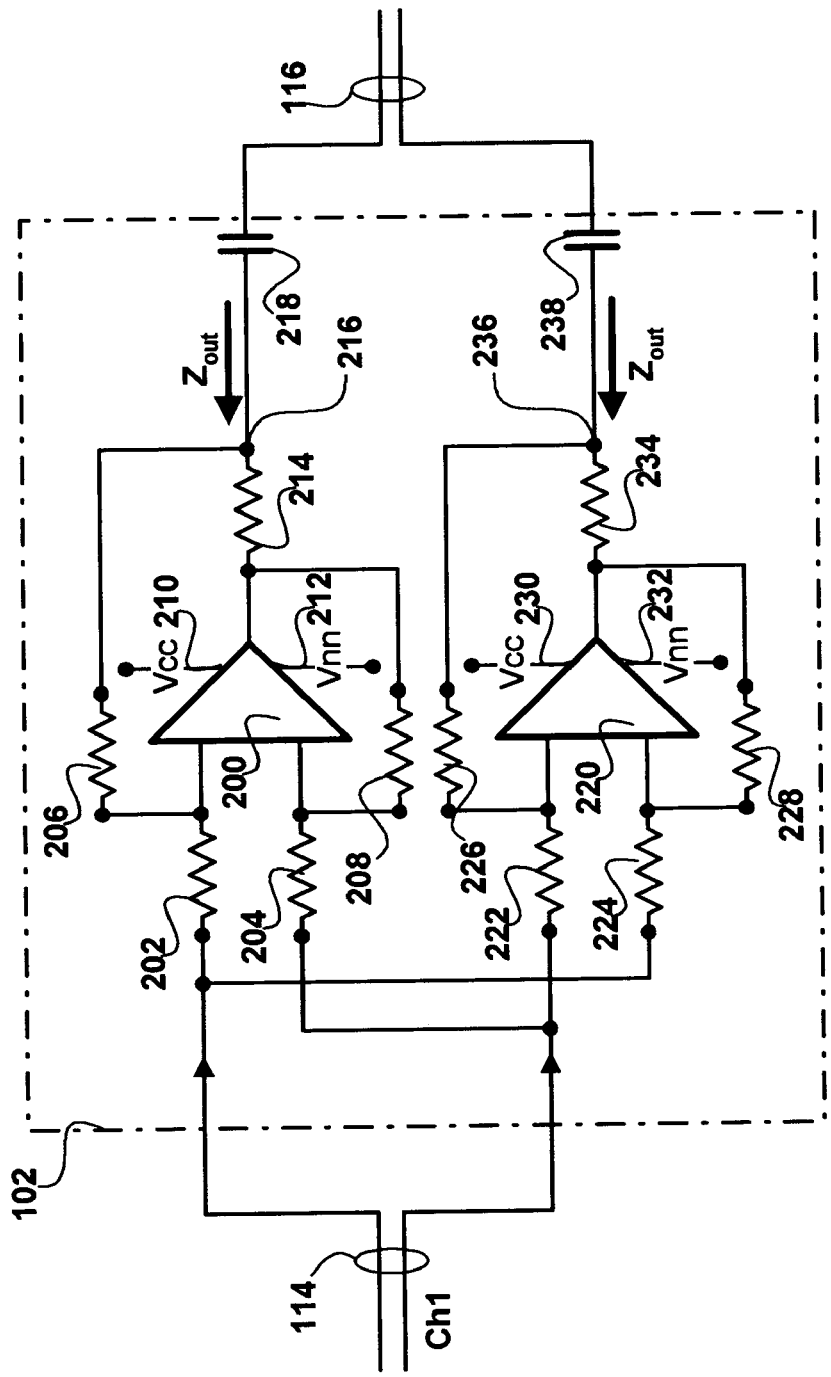
FIG. 2 is a detailed circuit diagram of an embodiment of the line amplifier shown in FIG. 1.

FIG. 2 is a detailed circuit diagram of an embodiment of the line amplifier 102 shown in FIG. 1. The line amplifier operates in differential mode and has an output impedance which matches the line impedance. The impedance is actively generated with a very low power loss. Two amplifiers 200 and 220 are shown, coupled to one another in differential mode. Amplifier 200 has positive Vcc and negative Vnn bias inputs 210 and 212 respectively. Amplifier 220 has positive Vcc and negative Vnn bias inputs 230 and 232 respectively. Each amplifier accepts a differential input of the analog information signal 114. At the input of amplifier 200 resistors 202-204 couple the differential inputs to the amplifier. Two feedback resistors 206 and 208 provide impedance synthesis so that the output impedance Zout at node 216 matches the subscriber line impedance reflected on the primary of the transformer 106 (typically 100 Ω). The impedance synthesis is achieved with via the two feedback paths established on either side of output resistor 214 which pass to the respective differential inputs of amplifier 200 via resistors 206 and 208. At the input of amplifier 220 resistors 222 and 224 couple the differential inputs to the amplifier. Two feedback resistors 226 and 228 provide impedance synthesis so that the output impedance Zout at node 236 matches the subscriber line impedance reflected on the primary of the transformer 106 (typically 100 Ω). The impedance synthesis is achieved using the two feedback paths established on either side of output resistor 234 which establish two feedback paths to the differential inputs of amplifier 220 via resistors 226 and 228. In the absence of the dual feedback configuration for both amplifiers a much larger resistance value for output resistors 214 and 234 would be required to obtain the proper output impedance.

The current configuration results in very low overhead in terms of power consumption in order to achieve the proper output impedance. The output signals from the line amplifiers 200 and 220 are capacitatively coupled via capacitor 218 and 238 respectively to the corresponding one of the differential outputs 116. These differential outputs couple to the 2-4 wire hybrid 104.

Figure 3A:
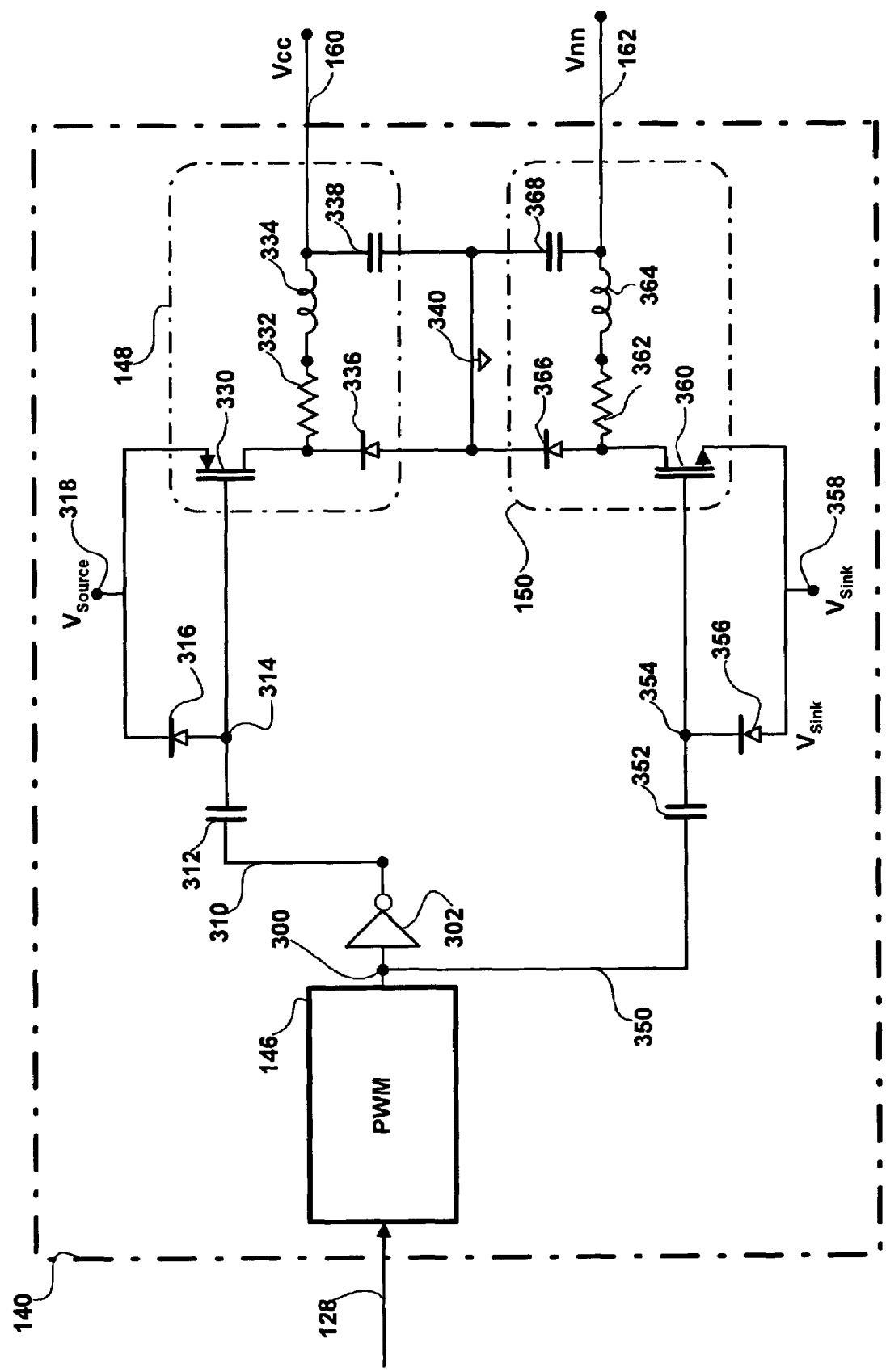
FIGS. 3A-B are detailed circuit diagrams of alternate embodiments of the power generator shown in FIG. 1.
Figure 3B:
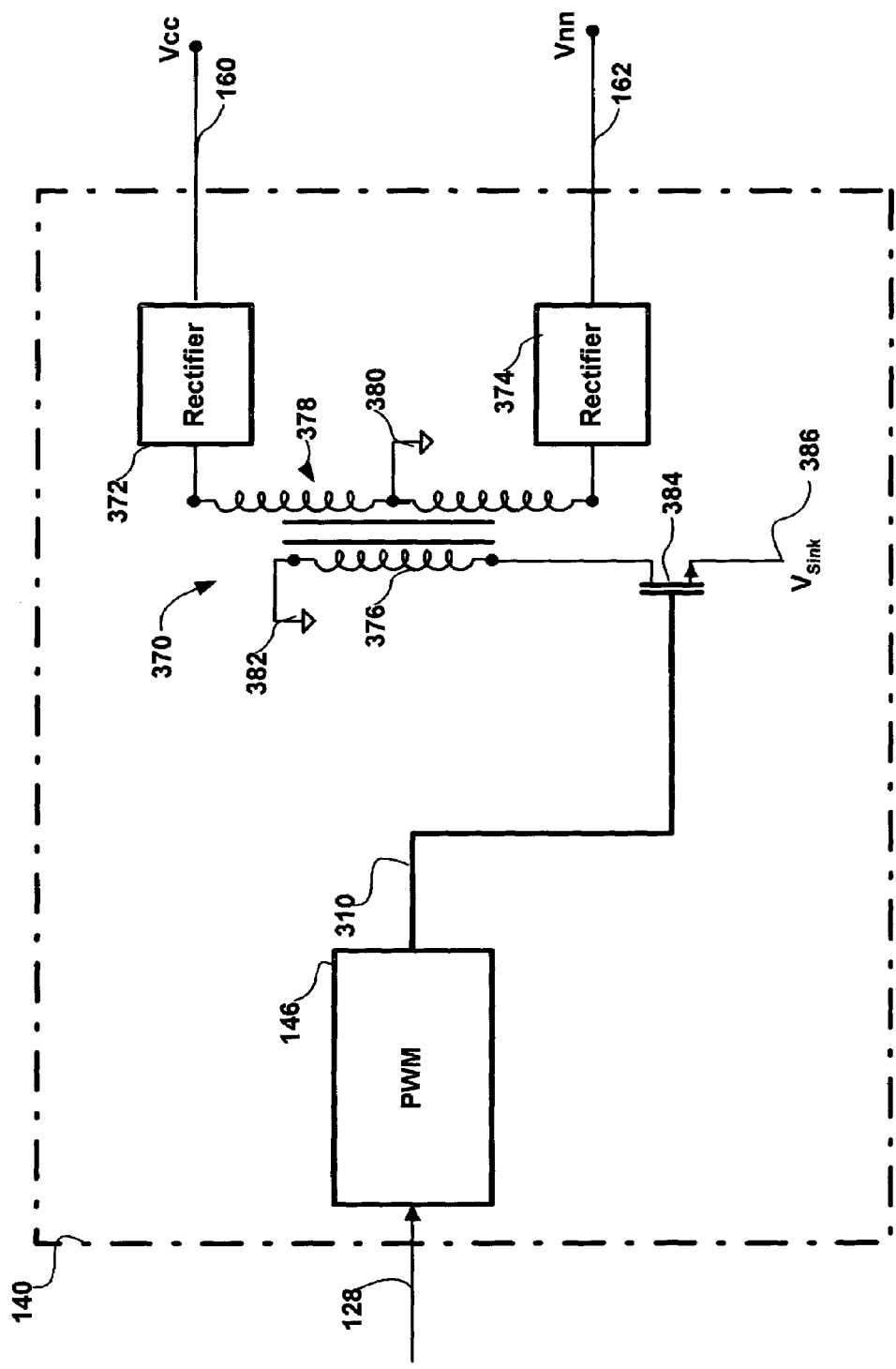

FIGS. 3A-B are detailed circuit diagrams of alternate embodiments of the power generator 140 shown in FIG. 1. In FIG. 3A the generator includes the PWM 146 and the Vcc and Vnn bias supplies which in the embodiment shown are implemented as switching regulators with integral low pass filters on the output. The peak signal 128 which corresponds with the absolute maximum peak value, i.e. maximum positive or minimum negative, in each sample is supplied to the PWM 146 with a level shift to provide the voltage overhead on the signal to assure that the line amplifier(s) 102 do not reach saturation at peaks in the input signal levels. For typical amplifiers this voltage overhead would be between 0.5V to 1.5V. This voltage is fed as one input to the PWM generator, the other input of which accepts a ramp waveform (not shown) with a period corresponding to $1/T_1$. The normal PWM output signal 152 will remain high until the ramp voltage exceeds the peak voltage at which the PWM output signal will drop low until the end of the sample interval.

The PWM output 300 is split into inverted and normal signals, 310 and 350 respectively. The inversion is performed by inverter 302. The inverted and normal PWM signals may be capacitatively coupled via capacitors 312 and 352 to the Vcc and Vnn switching regulators, 148 and 150 respectively. Clamp diodes 316 and 356 are coupled to the positive 318 and negative voltage supplies, $V_{source}$ and $V_{sink}$. The clamps are used to level shift the PWM normal and inverted drive signals to the switching regulators 148 and 150 respectively. Bleed resistors (not shown) can be coupled to normal and inverted signal lines at nodes 314 and 354 respectively to define the DC state of the drive signals in the absence of switching signals. Switching is performed in switching regulators 148 and 150 by PMOS transistor 330 and NMOS transistor 360 respectively. The frequency of switching of buck regulators 148 and 150 corresponds with the sample frequency $1/T_1$ for the sampler 122. As the sampling and switching frequency increases, power dissipation increases.

Within switching regulator 148 the source of PMOS 330 couples to the positive supply voltage $V_{source}$ and the drain of PMOS 330 is coupled via diode 336 with analog ground 340. On the drain of PMOS 330 an RLC combination (332,334, and 338) is configured as a low pass filter for the positive bias Vcc signal 160 to the amplifier 102 (FIG. 1) or the amplifier 200 and 220 (FIG. 2). Within switching regulator 150 the source of NMOS 360 couples with the negative supply voltage $V_{sink}$ and the drain is coupled via diode 366 with analog ground 340. On the drain of NMOS 360 an RLC combination (362,364, and 368) is configured as a low pass filter for the negative bias Vnn signal 162 to the amplifier 102 (FIG. 1) or the amplifiers 200 and 220 (FIG. 2).

The PMOS and NMOS transistors 330 and 360 are designed with low capacitance and rise and fall times several orders of magnitude less than the switching interval $T_1$. The resistance of a transistor switch may range from several ohms to a fraction of an Ohm so that the voltage drop and power dissipation across them is low, further enhancing the efficiency of the line driver. For ADSL implementations a switching frequency of 200 kHz or 1/5 uS may be appropriate. The rise times on Vcc and Vnn are faster than fall times. Slower decay of Vcc and Vnn is helpful to avoid high frequency transients on the line amplifier supplies. The Q of the inductors is selected to be low enough to avoid additional power loss but high enough to work with the series resistors 332 and 362 to keep the bias signals Vcc and Vnn from ringing. Capacitors 338 and 368 are chosen to be large enough to supply peak current transients. For an embodiment of the invention suitable for driving an ADSL signal onto a subscriber line, values of L=270 uH C=0.6 uF for inductors 334 and 364 and capacitors 338 and 368 may be suitable. Keeping the window interval $T_2$ reasonably large allows the waveforms of Vcc and Vnn to be smooth since the LC elements in the switching regulators and low pass filters have a large window to settle to the required value.

In FIG. 3B the generator includes: the PWM 146 and a center tap transformer 370. The primary 376 of transformer 370 is switchably coupled with a power source 384. The gate of switch 384 is driven by the PWM signal 310. The primary is switchably coupled by switch 384 between an analog ground 382 and a source/sink 386, in this example Vsink. The secondary 378 includes a grounded center tap 380. The secondary couples through full or half wave rectifiers 372 and 374 to drive the positive and negative bias supply lines 160 and 162 for Vcc and Vnn respectively.

FIGS. 4A-D are signal diagrams showing the operation of the power management system coupled to the line driver. An input signal 114 is shown over a time interval of 150 micro seconds. That signal arrives at the input of the line amplifier 102 (see FIG. 1) after the delay imposed by delay element/buffer 110. In this embodiment, the look ahead sliding window 410 generated by the control signal generator 120 (see FIG. 1) is shown with a window length $T_2$ of 40 uS and a sample length $T_1$ of 5 uS. The window is incremented along the timeline of the input signal by amounts corresponding with the sample interval $T_1$.

Figure 4A:
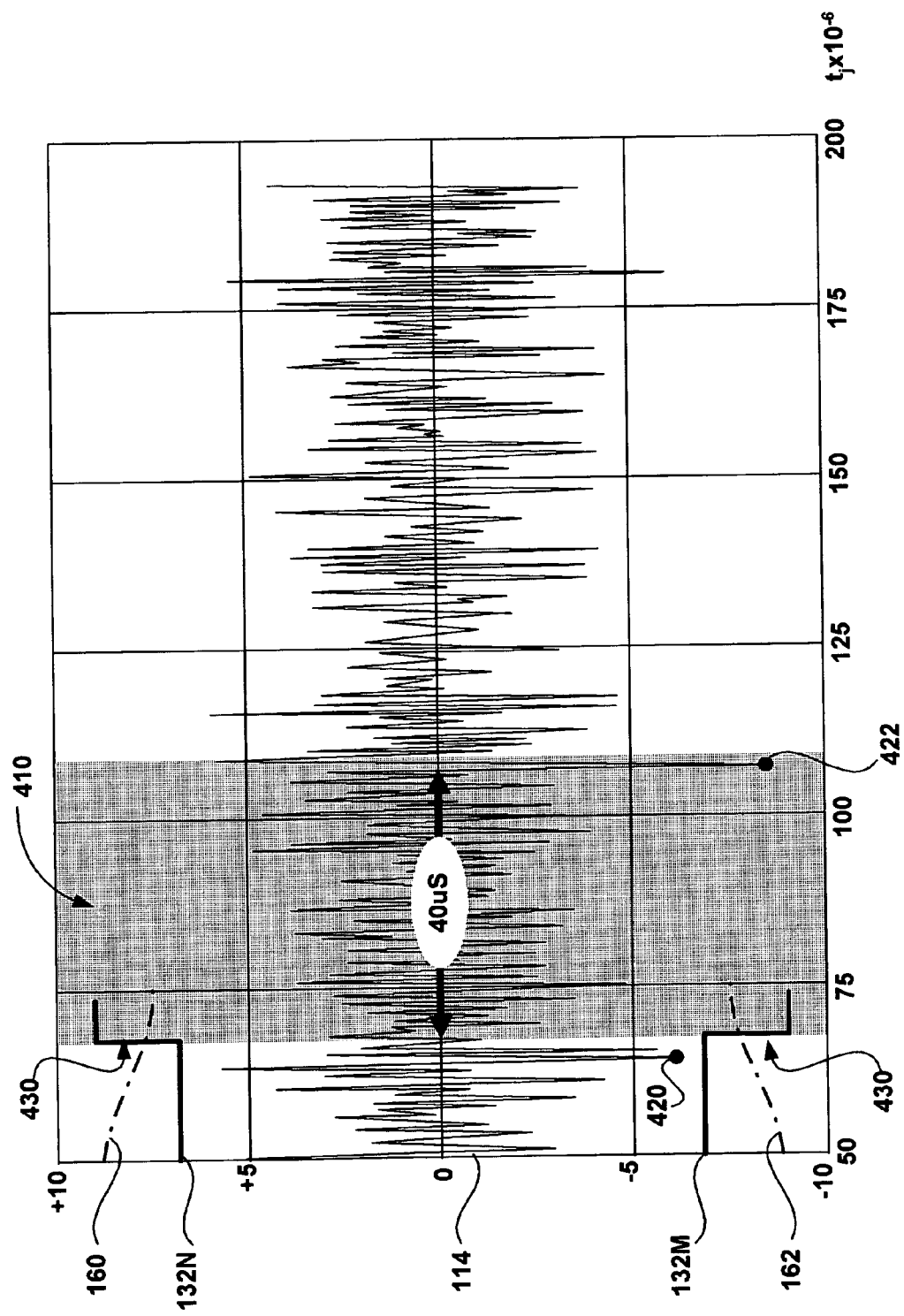
FIGS. 4A-D are signal diagrams showing the operation of the power management system coupled to the line driver.

In FIG. 4A the sliding window's leading and trailing edges are displaced from one another by 40 uS at 110 uS and 70 uS locations respectively with respect to the analog input signal 114. The peak signal from the control signal generator 120 (see FIG. 1) includes in this embodiment, normal and mirror components 132N and 132M respectively. The resultant low pass filtered bias signals 160, 162 (see FIG. 1) are also shown. In this and the following FIGS. 4B-D the normal and mirror components of the peak signal are shown as mirror images of one another, and at levels determined by one of a negative minimum or a positive maximum within the sliding window. This symmetry is desirable for several reasons.

The modulation of the bias signals Vcc, Vnn on lines 160-162 will introduce unwanted noise onto the output signal from the amplifier(s) 102 (see FIG. 1). The amount of noise will correspond with the power supply rejection ratio (PSRR) for the amplifier. In an embodiment of the invention, the PSRR may effectively be increased by requiring, as shown in FIGS. 4A-D, that the positive and negative bias signals Vcc and Vnn are highly symmetric mirror images of one another. The signals are mirror images in that as Vcc undergoes a positive swing in voltage of a fixed amount Vnn undergoes a negative variation by an equal and opposite amount. The voltage levels on Vcc and Vnn are equal and opposite to one another at all times even though the excursions of the information signal are not. This enforced symmetry attenuates the appearance of the AC component of these signals on the output of the line amplifier(s) which they are driving thereby increasing the power supply rejection ratio.

In alternate embodiments of the invention, the positive and negative bias voltages would vary independently of one another, without the requirement of mirroring one another. In this embodiment of the invention the supply swings would correspond with the positive and negative peaks in the input signal as detected by separate positive and negative peak detectors within the control signal generator circuit 120. Further improvements in efficiency would result, albeit at some tradeoff in terms of a reduction in PSRR.

In FIG. 4A the initial peak signal level is determined by a negative voltage minimum of approximately −6.5 volts at peak 420. The resultant voltage levels of +7 and −7 volts are found on peak signals 132N-M respectively. Each includes a 0.5V overhead to avoid saturation of line amplifier when amplifying the input signal at peak 420. A transition 430 in the peak signal at approximately 70 uS results from the appearance and detection of a negative peak 422 at −8.5 volts in the 5 uS sample set at the leading edge of the window 410. Peak detection, as discussed above results from sampling the information signal within each sample set at or above the Nyquist frequency. Upon detection of this peak in the information signal sample the peak signals are stepped to levels of ±9 volts. This assures that the bias signals 160-162 will have adequate time to rise to the appropriate levels by the time the delayed peak 422 is input to the amplifier(s).

Figure 4B:
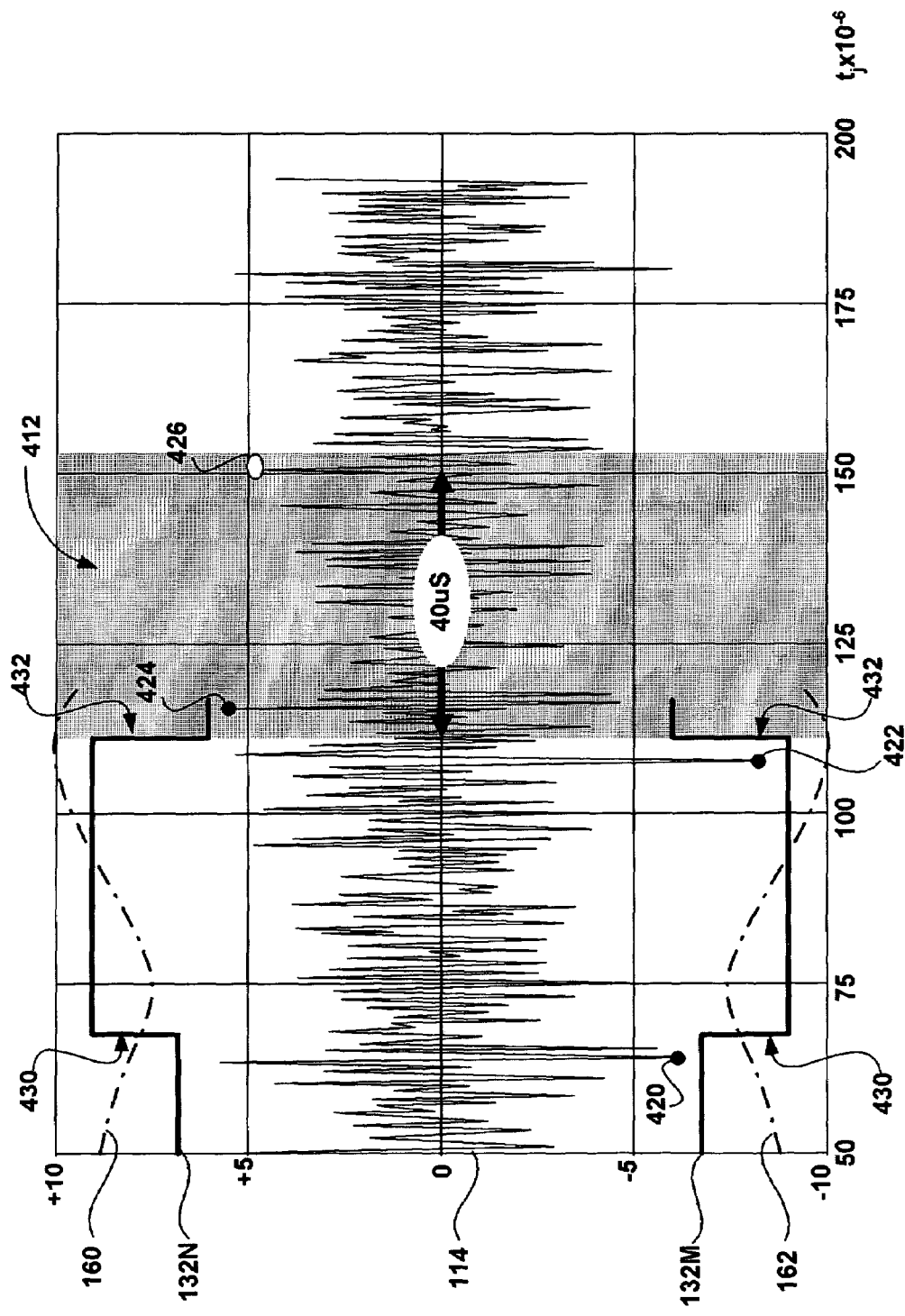

In FIG. 4B the window has been incremented 9 samples sets of 5 uS. The sliding window's leading and trailing edges are displaced from one another by 40 uS at 155 uS and 115 uS locations respectively with respect to the analog input signal 114. The trailing edge of the window 412 no longer includes peak 422. Within the 5 uS sample set (150 uS-155 uS) at the leading edge of the window a sample peak 426 is located. The peak is not as large as the window peak 424 at the trailing edge of the window which has a voltage level of +5.5 volts. Thus there is a transmition 432 in the normal and mirror peak signals 132N-M to levels of +6 and −6 volts respectively. Each include the 0.5V overhead discussed above.

Figure 4C:
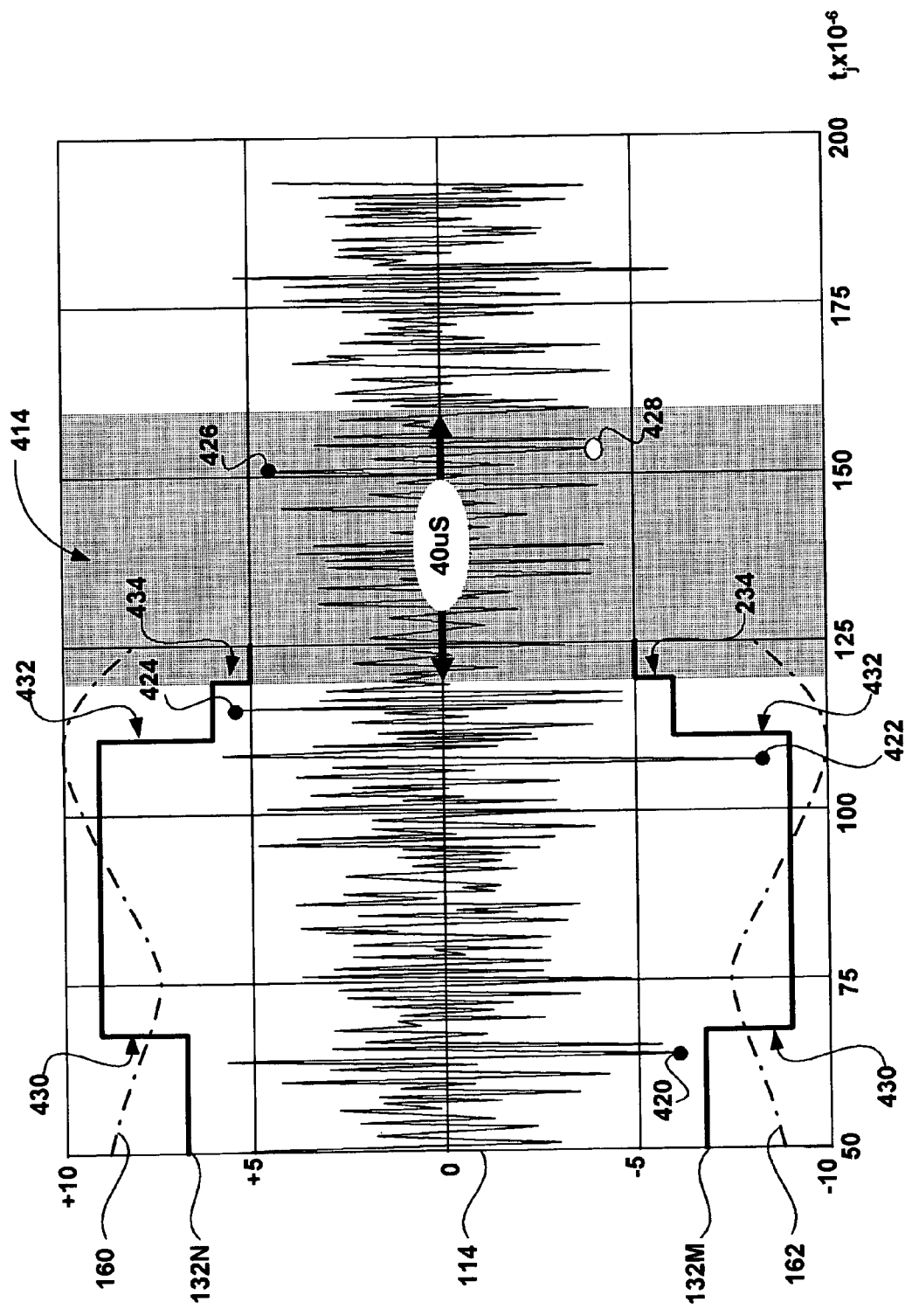

In FIG. 4C the window has been incremented by a single samples set of 5 uS. The sliding window's leading and trailing edges are displaced from one another by 40 uS at 160 uS and 120 uS locations respectively with respect to the analog input signal 114. The trailing edge of the window 412 no longer includes peak 424. Within the 5 uS sample set (150 uS-155 uS) at the leading edge of the window a sample peak 428 is located. This peak is not as large as the window peak 426 which is moved further along the window and which has a voltage level of +4.5 volts. Thus there is a transition 434 in the normal and mirror peak signals 132N-M to levels of +5 and −5 volts respectively. Each includes the 0.5V overhead discussed above.

Figure 4D:
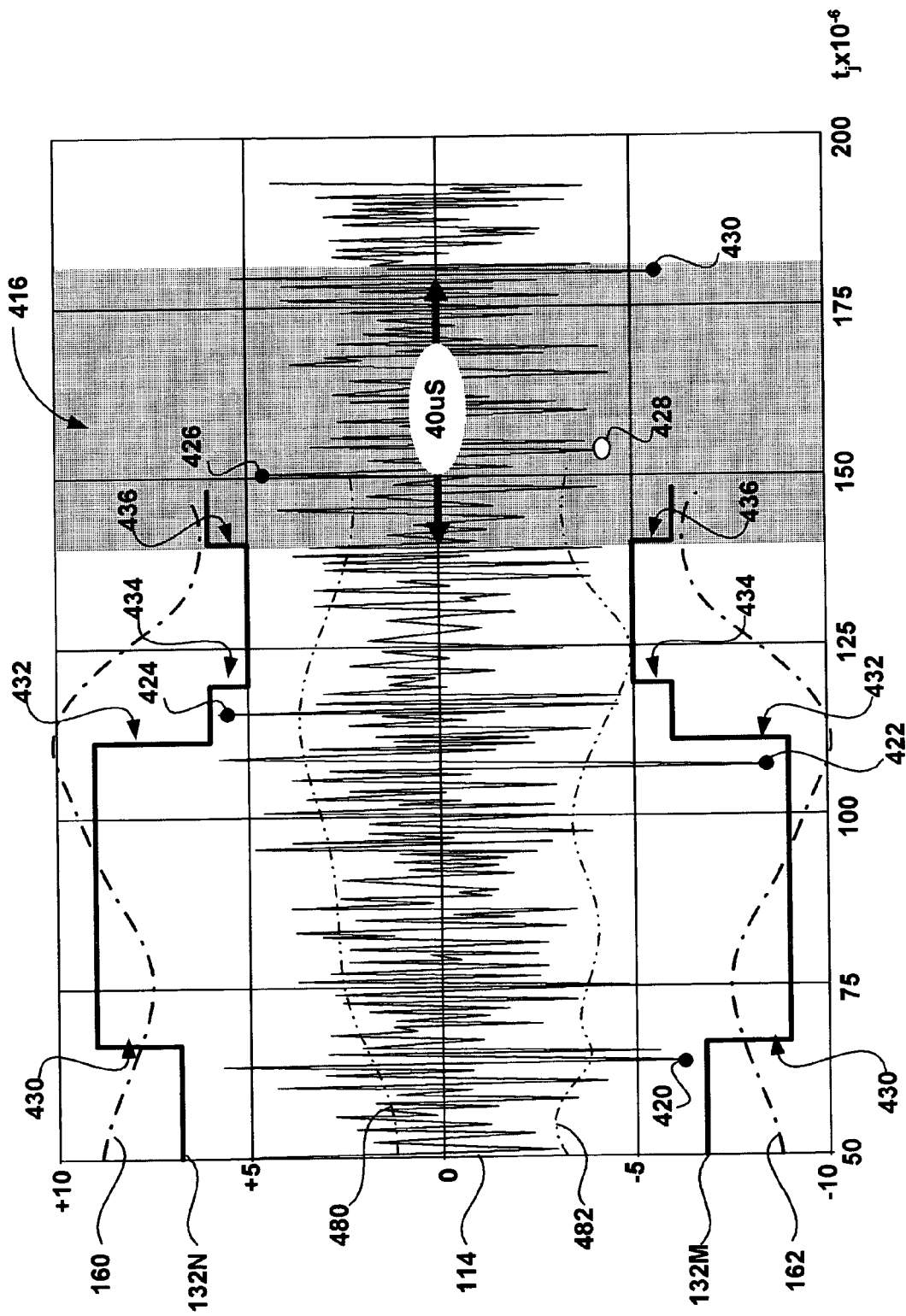

In FIG. 4D the window has been incremented by a 4 samples sets. The sliding window's leading and trailing edges are displaced from one another by 40 uS at 180 uS and 140 uS locations respectively with respect to the analog input signal 114. Within the 5 uS sample set (150 uS-155 uS) at the leading edge of the window a sample peak 430 is located. This negative minimum peak with a voltage of −5.5 volts is larger than the previous peak 428 which is still in the window. Thus there is a transition 436 in the normal and mirror peak signals 132N-M to levels of +6 and −6 volts respectively.

In FIG. 4D signal lines 480-482 show a low pass filter envelope of the analog input signal. The windowing technique of the current invention avoids the clipping, low power supply rejection ratios and cross modulation that would result from peak detection based on envelope detection.

Figure 5:
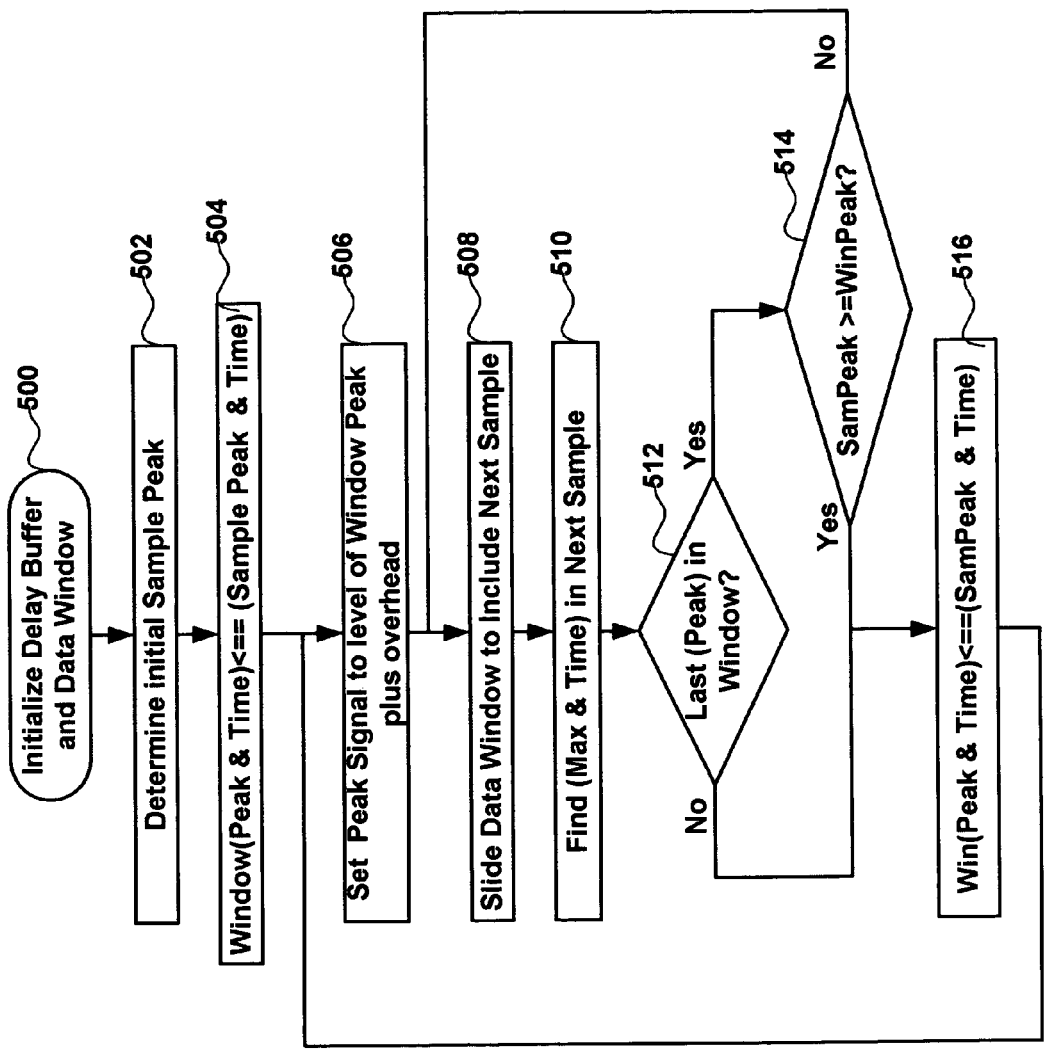
FIG. 5 is a process flow diagram of the processes associated with power management.

FIG. 5 is a process flow diagram of the process associated with power management performed by the control signal generator 120 shown in FIG. 1. These processes may be implemented in the analog or digital domain. Processing begins in process 500 with the initialization of the delay element 110 and the loading of the sample buffer 122 shown in FIG. 1. In process 502 the peak in the sample is determined.

Since the sample peak is the only peak in the window at this point, the value for the window peak is set equal to that of the sample peak in process 504.

Next, in process 506 the normal and mirror peak signals are generated at equal and opposite voltage levels, assuming no DC bias in the information signal, and are output to drive the power generator. These signals include the above discussed overhead voltage to avoid driving the line amplifier into saturation during the amplification of the peak signal. In process 508 the sliding window is moved forward by obtaining the next sample of the analog information signal and by decrementing the down counter. Then in process 510 the sample peak detector 126 (See FIG. 1) determines the peak in the sample. In digital embodiments of the invention which did not rely on a down counter, a time stamp could also be recorded for the sample set.

Next in decision process 512 a determination is made as to whether the last peak which determined the peak signal level is still within the window. In a digital implementation this would correspond to determining whether there was a peak value stored in the window peak register 128 or whether the register was set to be overwritten by whatever peak was detected in the current sample. If no peak exists in the window then control passes to process 516. In process 516 the sample peak becomes the window peak. In the embodiment shown in FIG. 1, this corresponds to the value in the window peak register 128 being overwritten with the value in the sample peak detector after a reset of the down counter, upon reaching zero.

If alternately, in decision process 512 it is determined that the last peak is still in the window then the control passes to decision process 514. In decision process 514 a determination is made as to whether the sample peak exceeds the window peak. If not then control returns to process 508 for the processing of the next sample. Alternately, if the sample peak does exceed in absolute magnitude sample peak then control passes to process 516. In process 516 the sample peak becomes the window peak. Control then returns to process 506 for the shifting of the peak signal to a new level to correspond with the new window peak value.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A line driver for driving a data signal input onto a communication medium, and the line driver comprising:
    at least one amplifier with at least one bias supply input, a signal input and an output;
    a delay element accepting as an input the data signal delaying delivery of the data signal to the signal input of the at least one line amplifier for amplification;
    a generator responsive to a control signal to generate varying power levels corresponding thereto on the at least one bias supply input of the at least one amplifier;
    a control signal generator configured to iteratively determine at an interval of duration $T_1$, a peak value in a corresponding windowed portion of the data signal spanning an interval $T_2$ greater than $T_1$ in duration, and to generate the control signal corresponding to the iteratively determined peak value in advance of delivery of the data signal to the at least one amplifier, wherein the control signal generator further comprises:

a first peak detector to detect peaks in successive data signal samples of duration $T_1$;

a window peak register coupled to the first peak detector to maintain parameters corresponding with the peaks detected by the first peak detector for the corresponding windowed portion of the data signal spanning the interval $T_2$ and to generate the control signal corresponding thereto.

2. The line driver of claim 1, wherein the generator further comprises:
a pulse width modulator responsive to the control signal at an input to generate a pulse width modulated signal; and
a pair of switching regulators coupled to the pulse width modulator to receive the pulse width modulated signal and responsive thereto to provide the varying voltage levels on a positive one of the at least one bias supply input and a negative one of the at least one bias supply input of the at least one amplifier.

3. The line driver of claim 1, wherein the generator further comprises:
a pulse width modulator responsive to the control signal at an input to generate a pulse width modulated signal;
a transformer with a primary and a secondary with a center tap, and the primary switchably coupled to power by a switch responsive to the pulse width modulated signal, and the secondary responsive thereto generating voltage levels for a positive one of the at least one bias supply input and a negative one of the at least one bias supply input; and
a pair of rectifiers coupled between the positive one and the negative one of the at least one bias supply and the secondary to rectify the voltage supplied.

4. The line driver of claim 1, wherein the at least one bias supply input on the at least one amplifier includes a positive bias supply input and a negative bias supply input and the varying voltage levels on the positive and negative bias supply inputs generated by the generator are equal and opposite one another.

5. The line driver of claim 1, wherein the at least one amplifier further comprises:
a pair of amplifiers each with a pair of differential inputs, and the pair of amplifiers coupled to one another to provide a pair of differential outputs;
a pair of output resistors each coupled to an output of a corresponding one of the pair of amplifiers; and
feedback resistors each coupling opposite ends of each one of the pair of output resistors to a corresponding one of the pair of differential inputs of each of the pair of amplifiers to provide active output impedance synthesis.

6. The line driver of claim 1, wherein the data signal input exhibits an XDSL protocol.

7. The line driver of claim 1, wherein the data signal input exhibits one of a discrete multi-tone (DMT) line code and carrierless AM/PM (CAP) line code.

8. The line driver of claim 1, wherein the communication medium comprises at least one of: a wired communication medium and a wireless communication medium.

9. A method for driving a data signal input onto a communication medium, and the method comprising:
iteratively determining at an interval of duration $T_1$ a peak value in a windowed portion of the data signal input spanning an interval $T_2$ greater than $T_1$ in duration;
creating at least one control signal with a magnitude corresponding to the iteratively determined peak value;
generating varying bias supply power levels responsive to the delivery of the control signal;
delaying the data signal input to synchronize with the iteratively determining, creating and generating acts; and
amplifying the data signal input delayed in said act of delaying using the varying bias supply power levels generated in said act of generating to drive the data signal onto the communication medium, wherein the iteratively determining act further comprises:
detecting peaks in successive input signal samples of duration $T_1$;
maintaining parameters corresponding with peaks detected in the detecting act for the windowed portion of the data signal spanning the interval $T_2$; and
generating the control signal corresponding to the parameters maintained in the maintaining act.

10. The method for driving the data signal of claim 9, wherein the generating act further comprises:
generating a pulse width modulated signal corresponding in pulse width to the control signal; and
filtering the pulse width modulated signal to vary the bias supply voltage levels.

11. The method for driving the data signal of claim 9, wherein the varying bias supply power levels generated in said act of generating include positive and negative bias supply voltage levels equal and opposite one another.

12. The method for driving the data signal of claim 9, wherein the communication medium comprises at least one of: a wired communication medium and a wireless communication medium.

13. A means for driving a data signal input onto a communication medium, and the means comprising:
means for iteratively determining at an interval of duration $T_1$ a peak value in a windowed portion of the data signal input spanning an interval $T_2$ greater than $T_1$ in duration;
means for creating at least one control signal with a magnitude corresponding to iteratively determined peak value;
means for generating varying bias supply power levels responsive to the delivery of the control signal;
means for delaying the data signal input to synchronize with the means for iteratively determining, creating and generating means; and
means for amplifying the data signal input delayed by said means for delaying at the varying bias supply power levels generated by said means for generating to drive the data signal onto the communication medium, wherein the means for iteratively determining further comprises:
means for detecting peaks in successive input signal samples of duration $T_1$;
means for maintaining parameters corresponding with the peaks detected by the means for detecting for the windowed portion of the data signal spanning the interval $T_2$; and
means for generating the control signal corresponding to the parameters maintained by the means for maintaining.

14. The means for driving the data signal of claim 13, wherein the means for generating further comprises:
means for generating a pulse width modulated signal corresponding in pulse width to the control signal; and
means for filtering the pulse width modulated signal to vary the bias supply power levels.

15. The means for driving the data signal of claim 13, wherein the varying bias supply power levels generated by said means for generating include positive and negative bias supply voltage levels equal and opposite one another.

* * * * *